3,175,928
ANHYDROUS HCl MODIFICATION OF FLOUR
Earl B. Lancaster and Edward L. Griffin, Peoria, Ill., assignors to the United States of America, as represented by the Secretary of Agriculture
No Drawing. Filed May 2, 1963, Ser. No. 277,661
2 Claims. (Cl. 127—38)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a commercially advantageous process for treating ungelatinized wheat flour with anhydrous hydrogen chloride to provide highly dispersible acid-modified flours, aqueous pastes of which have low viscosities at high solids contents and which contribute greatly improved dry strengths to paper that has been tub-sized therewith.

More particularly this invention relates to a process in which wheat flour which has been partially dried under mild and non-gelatinizing conditions to a critical but very inexpensively achieved moisture content of 7.5–10.5 percent is subjected in a very uniform manner to the action of 1.2–1.6 g. of gradually introduced dry HCl gas per 100 g. (dry basis) of the said partially dried flour for about 40–100 minutes at a preferred temperature of 25–45° C. before adding gaseous ammonia or spraying thereon a neutralizing solution of alkali, and blending for about 60–90 minutes.

Morris, U.S. Patent No. 2,359,378, teaches subjecting starch containing not over 6 percent moisture to the action of HCl gas prior to heat dextrinization of the partially modified starch.

Wimmer et al., U.S. Patent No. 2,894,859, teach the preparation of dextrinized flour adhesives for gypsum board, said adhesives being prepared by the action of a small amount of gaseous HCl on dried flours in which the originally moist starch granules have been pregelatinized and/or ruptured by cooking or by brief exposure to super-heated rolls.

Rankin et al., U.S. Patent No. 3,073,724, show the preparation of highly dispersible sizing agents for paper by adding an aqueous solution of mineral acid to flour that previously has been dried to a maximum moisture content of 1.4 percent under mild conditions that avoid gelatinization of the individual starch granules and then adding sufficient aqueous alkali to provide a neutral product. It is clear, however, that the requirement that the flour be gently pre-dried to a moisture contetn of 0.7–1.4 percent is costly and commercially disadvantageous since the removal of practically the last vestiges of water involves additional energy costs and facilities, and markedly lengthens the production time.

The principal object of our invention is the provision of an improved and more economical process for acid-modifying wheat flour to provide a product that pastes readily in water to form an excellent sizing agent for paper.

Another object is the provision of a process for preparing a critically modified flour, aqueous pastes of which have high fluidities (low viscosities) at high solids concentrations and are further characterized by having exceptionally uniform rheological properties and by the ability to greatly increase the dry strength of paper sized therewith.

A further object is the provision of a process in which the wheat flour that is to be acid-modified requires only a very small and easily attainable amount of drying.

Still another object is the provision of a process in which as consequences of the rate and the particularly uniform manner in which the anhydrous HCl is made available to the flour particles having the aforesaid critical moisture content, the gaseous acid very uniformly attacks and penetrates the surface of each individual starch granule, which apparently outwardly comprises mainly the branched or amylopectin fraction of starch, and then in apparently weakened manner slowly proceeds centrally therefrom as moisture is encountered to cause a minimal depolymerization of the centrally preponderant amylose units, thus resulting in the avoidance of extensive degradation of the strength-contributing amylose component of the starch granule.

The foregoing objects and advantages of the instant invention have now been achieved by mixing wheat flour that has a critical moisture content of 7.5–10.5 percent at a temperature of about 21° C.–50° C. with 1.2 to 1.6 g. of anhydrous HCl gas per 100 g. of the flour (dry basis), the dry HCl gas being slowly introduced to the flour through a valve located in the bottom of a high speed mixing device, e.g., a ribbon blender, at the rate of 0.019–0.020 g. of HCl gas per minute per 100 g. of flour (dry basis) or, if the anhydrous HCl is diluted with at least 10 parts of an inert gas such as nitrogen, at the rate of 0.065–0.170 g. dry HCl per minute per 100 g. of the flour, further mixing the gas-exposed flour for about 40–100 minutes while maintaining the aforesaid temperature, and then introducing a neutralizing amount of ammonia gas or a concentrated alkali solution in the form of a fine spray, and continuing the mixing for about 60–90 minutes to effect neutralization.

The following examples are intended merely to illustrate our invention in greater detail without limiting its scope thereto. It might also be pointed out that neutralization with ammonia gas eliminates the possibility of having to add a partial drying step for the final product if the alkali was not sufficiently concentrated and the acid-modified flour is to be stored for an appreciable period and that it also causes the product to have a significantly more uniform and smaller particle size than can be obtained on neutralizing with solutions of alkali.

*Example 1*

Fifteen kg. of wheat flour having a moisture content of 8.2 percent was placed in a water-jacketed ribbon blender, and 210 g. of anhydrous HCl gas was admitted through an orifice in the bottom of the blender during the following 80 minutes (approximately 2.62 g. per minute), the flour being held at a temperature of 21–31° C. Mixing was then continued for 40 minutes at the above temperature level before spraying 440 ml. of 14 N NaOH solution through an orifice in the top of the blender. Mixing was continued for 90 minutes. The acid-modified and neutralized flour showed no black specks which would be indicative of local over-reaction. An aqueous paste having a 20 percent solids content had an apparent viscosity at 55° C. of 65 Brabender units. Paper tub-sized with this product at a 3 percent retention level had a 34 percent increase in burst strength and a 13 percent increase in tensile strength compared with untreated controls.

*Example 2*

14.3 kg. of wheat flour having a moisture content of 10.0 percent was placed in the ribbon blender of Example 1 and brought to a temperature of 43° C. A 10:1 mixture of nitrogen and anhydrous HCl gas was introduced to the blender over a period of 22 minutes, the total HCl amounting to 190 g. (about 8.64 g. per minute). Mixing of the acid-exposed flour was continued for 100 minutes, the temperature being held at 38–43° C. Then 385 ml. of 14 N NaOH was sprayed onto the flour, and mixing was continued for 1 hour. When a 20 percent solids paste was prepared in a Brabender amylograph and cooled to 55° C. it had an apparent viscosity of 160 Brabender units. The dispersibility of the cooked paste as determined by centrifuging at 2200 r.p.m. was 91 percent of the total solids and 72 percent of the total protein content. The blue value showed that 92 percent of the original amylose content remained undegraded and intact.

*Example 3*

Fourteen kilograms of wheat flour having a protein content of 8.5 percent and a moisture content of 10.3 percent was reacted in the ribbon blender of Example 1 at a temperature of 41–44° C. The nitrogen and HCl mixture (10:1 by volume) was introduced in 8 minutes at the rate of 20.4 grams of HCl per minute. At this temperature, 67 minutes of acid reaction were required to bring the viscosity of a 20 percent paste at 55° C. to a desired level of 95 Brabender units. Then 76 grams of anhydrous ammonia gas was introduced as a 1:7 mixture with nitrogen in 15 minutes. The total dispersibility of the acid-modified flour was 91 percent, and the protein was 54 percent dispersible. The blue value was 86 percent of the original value, and the size of the dry product particles was such that 98.6 percent of the particles passed through a 60-mesh screen. Paper tub-sized with an aqueous dispersion of the product showed dry strength increases comparable to those obtained with the best performing commercial starches Having disclosed our invention, we claim:

1. A process of modifying raw wheat flour comprising adjusting the moisture content of the raw wheat flour to a value of about from 7.5 to 10.5 percent, modifying the resulting flour by vigorously mixing it in a ribbon blender having bottom gas inlet means while introducing through said means about from 1.2 to 1.6 grams per 100 grams of the flour, on a dry basis, of an acid selected from the group consisting of anhydrous HCl gas and anhydrous HCl gas diluted with at least about 10 volumes of an inert gas, while maintaining said flour at a temperature of about from 21° to 50° C., said acids being introduced to the flour at the respective rates of about from 0.019 to 0.020 gram and about from 0.065 to 0.170 gram of acid per minute per 100 grams of flour, on a dry basis, stirring the resulting acid-modified flour for about from 40 to 100 minutes while maintaining the aforesaid temperature, mixing a neutralizing quantity of a neutralizing agent selected from the group consisting of a concentrated aqueous solution of an alkali metal hydroxide and anhydrous ammonia gas with the stirred, acid-modified flour, and continuing mixing the neutralizing agent and acid-modified flour for about from 60 to 90 minutes to effect neutralization of the flour.

2. The process of claim 1 wherein the neutralizing agent is anhydrous ammonia gas.

References Cited by the Examiner
UNITED STATES PATENTS

| | | | |
|---|---|---|---|
| 2,359,378 | 10/44 | Morris | 127—38 |
| 2,601,335 | 6/52 | Slotter | 127—38 |

MORRIS O. WOLK, *Primary Examiner.*